United States Patent [19]
Gyugyi et al.

[11] Patent Number: 5,343,139
[45] Date of Patent: Aug. 30, 1994

[54] GENERALIZED FAST, POWER FLOW CONTROLLER

[75] Inventors: Laszlo Gyugyi, Penn Hills Township, Allegheny County; Colin D. Schauder, Murrysville Boro, Westmoreland County, both of Pa.

[73] Assignee: Westinghouse Electric Corporation, Pittsburgh, Pa.

[21] Appl. No.: 828,845

[22] Filed: Jan. 31, 1992

[51] Int. Cl.$^5$ .............................................. G05F 5/00
[52] U.S. Cl. .................................... 323/207; 363/39; 307/105
[58] Field of Search .................. 363/34, 35, 37, 39, 363/40, 51; 323/205, 207, 208, 209, 210; 307/102, 105

[56] References Cited

U.S. PATENT DOCUMENTS

| | | | |
|---|---|---|---|
| 4,651,265 | 3/1987 | Stacey et al. | 363/35 |
| 4,930,064 | 5/1990 | Tanaka et al. | 363/161 |
| 5,041,959 | 8/1991 | Walker | 363/79 |
| 5,051,683 | 9/1991 | Hirose et al. | 323/207 |
| 5,136,494 | 8/1992 | Akagi et al. | 363/34 |
| 5,198,746 | 3/1993 | Gyugyi et al. | 323/207 |

FOREIGN PATENT DOCUMENTS 0030761  3/1978  Japan .................. 323/207

OTHER PUBLICATIONS

A Unified Power Flow Control Concept For Flexible AC Transmission Systems, Laszlo Gyugyi, Conference Publication 345, Fifth International Conference, IEE, London, Sep. 17–20, 1991 pp. 19–26.

10 MW GTO Converters For Battery Peaking Service, Loren H. Walker, IEEE IAS SPCC 88–78, pp. 1–9.

*Primary Examiner*—Steven L. Stephan
*Assistant Examiner*—Adolf Berhane

[57] ABSTRACT

First and second dc linked, preferably voltage sourced, inverters are connected to an electric power transmission line in shunt and in series, respectively, by coupling transformers. Firing of the GTO-thyristors of the first inverter is controlled to regulate reactive power on the transmission line and to supply real power requirements of the second inverter. The second inverter is controlled to inject into the transmission line in series a voltage which can be adjusted in magnitude and from zero through 360 degrees in phase with respect to the transmission line voltage to selectively adjust any one or more of transmission line voltage magnitude, transmission line impedance and transmission line voltage phase angle. In a high power configuration of the controller each of the inverters includes a plurality of six-pluse inverter modules connected by interstage transformers to form balanced higher order pulse groups controlled through pulse width modulation or through adjustment of the phase between opposite groups to generate the appropriate ac voltages.

16 Claims, 8 Drawing Sheets

GENERALIZED FAST, POWER FLOW CONTROLLER

BACKGROUND OF INVENTION

1. Field of Invention

This invention relates to apparatus for controlling the flow of power on ac power transmission lines, and in particular, a power flow controller which can control any one or more of reactive power flow, transmission line impedance, transmission line voltage magnitude, and transmission line voltage phase angle.

2. Background Information

Electric power flow through an ac transmission line is a function of the line impedance, the magnitude of the sending and receiving end voltages, and the phase angle between these voltages. To date, electric power transmission systems have been designed with the understanding that these three parameters determining the power flow cannot be controlled fast enough to handle dynamic system conditions. Furthermore, the available control means usually compensated or controlled only one of the three variables: impedance, voltage, or phase-angle. That is, transmission systems having been designed with fixed or mechanically-switched series and shunt reactive compensations, together with voltage regulating and phase-shifting transformer tap changers, to optimize line impedance, minimize voltage variation, and control power flow under steady-state or slowly changing load conditions. The dynamic system problems generally have been handled by overdesign; power transmission systems have been designed with generous stability margins to recover from worst case contingencies resulting from faults, line and generator outages, and equipment failures. This practice of overdesign, of course, has resulted in the under utilization of the transmission system.

In recent years, energy, environment, right-of-way, and cost problems have delayed the construction of both generation facilities and new transmission lines. This has necessitated a change in the traditional power system concepts and practices; better utilization of existing power systems has become imperative.

Higher utilization of power transmission systems, without an appreciable degradation in the reliability of the supply of electric power, is possible only if the power flow can be controlled rapidly during the following dynamic system disturbances.

The electric transmission system is frequently subjected to disturbances of various magnitudes. For example, some power generators or some of the parallel transmission lines may be switched out for maintenance. Large loads may be switched on and off. There may also be line to ground or line to line faults due to insulation break-downs or equipment failures. These disturbances may result in a sudden and sharp increase or decrease in the transmitted electric power. The electric power is provided by rotating generators driven by some kind of turbines which generate mechanical power. The mechanical output power of the turbines cannot be changed quickly to bring the mechanical power in balance with the new and rapidly changing electrical power demand. Consequently, the generators are forced to accelerate or decelerate. The change in rotational speed in some generators results in a corresponding angular position change with respect to the steady angular position maintained at the other end of the line by other generators. The angular position change between the sending and receiving end generators alters the amount of electric power transmitted. Once the disturbance is over (fault cleared, new transmission system configuration, new power generation level or new load demand established), the disturbed generators try to assume a new angular position appropriate to the new steady-state condition of the power system. However, the generators together with the associated turbines have significant rotational inertia and, for this reason, the new angular position is usually reached only after an "overshoot" or oscillation. These transient angular changes and oscillations, of course, manifest themselves as transient electric power changes and oscillations. In the extreme case, these transient changes cannot be stabilized; the equilibrium between the available mechanical power and transmitted electric power cannot be reestablished and the angular "overshoot" keeps increasing (that is, the machine keeps accelerating) until the generator is shut down. It also can happen that the angular oscillation remains unchanged, or even grows, due to insufficient damping of the power system. Ultimately, this would also result in a power system shut down.

The ability of a power system to provide electric power to meet load demand is indicated by the term "stability". The term stability means that the generators of an electric power system tend to run in synchronism. The term "transient stability" means that a power system can recover normal operation following a major disturbance (fault, loss of generation, etc.). The term "dynamic stability" means that a power system can recover normal operation following a minor disturbance that initiates power oscillation. In other words, a dynamically stable power system has positive damping.

In the last fifteen years, considerable efforts have been expended in the development of fast, thyristor-controlled equipment for the dynamic compensation and control of ac electric power transmission systems. Again, this thyristor-controlled equipment addressed one of the three power system parameters which determine power flow: voltage, impedance, and phase-angle. Thus, thyristor-controlled static var compensators, thyristor-controlled series compensators, and thyristor-controlled phase-shifting transformers have been or are being developed for the control of transmission line voltage (achieved by the control of reactive power flow), line impedance, and phase-angle.

Thyristor-controlled, static var compensators are used to control indirectly the transmission line voltage, and thereby the transmitted electric power, by generating reactive power for, or absorbing it from, the transmission system. These static var compensators have fast response (one to two cycles) to dynamic changes affecting the power flow and, with sufficient VA rating, they can increase both the transient and dynamic stabilities of the power system significantly.

Present static var compensators use fixed and/or thyristor-switched capacitors together with thyristor-controlled reactors. In the capacitive output domain, the fixed and thyristor-switched capacitors approximate, with a positive variance, the vat generation demand (for the desired transmission voltage level) in a step-like manner and the thyristor-controlled reactors absorb the surplus capacitive vars. In the inductive output domain, the thyristor-controlled reactors are operated at the appropriate conduction angle to provide the required var absorption. With proper coordination of the capacitor switching and reactor control, the var output can be varied continuously and rapidly between the capacitive and inductive rating of the equipment. The static var compensator is normally operated to regulate the voltage of the transmission system, sometimes with an option to provide an appropriate voltage modulation to damp power oscillations.

A more recently developed, and radically different, implementation of the static var compensator uses a solid-state switching converter connected in shunt with the transmission line by a coupling transformer. The switching converter is usually a voltage-sourced inverter using gate-turn-off (GTO) thyristors and operated from a dc storage capacitor to generate an output voltage which is in phase with the ac system voltage, V. The amplitude of the inverter output voltage Vo is rapidly controllable with respect to the amplitude of the ac system voltage V. When Vo=V, (ignoring the turn ratio of the coupling transformer) the inverter draws no current. However, when Vo>V, the current drawn by the inverter via the leakage inductance of the transformer is purely capacitive. Similarly, when Vo<V, the current drawn by the inverter becomes inductive. Thus, by controlling the output voltage of the inverter between the rated values of Vomax and Vomin, the reactive output current can be varied continuously from maximum capacitive to maximum inductive.

As stated above, the electric power in a transmission line can also be varied by the control of the overall line impedance. This can be accomplished by providing a controllable series line compensation, which in effect decreases (or increases) the reactive impedance of the line. The thyristor-controlled series line compensator, similarly to the shunt connected static var compensator, can be implemented either by thyristor-switched capacitors or by a fixed series capacitor shunted by a thyristor-controlled reactor.

A novel, solid-state series-compensating scheme, using a switching power converter is proposed in our commonly owned U.S. Pat. No. 5,198,746. In that system, a voltage-sourced inverter is used to insert voltage Vc (of the fundamental ac frequency) in series with the line. Voltage Vc, generated by the inverter, is in quadrature (lagging) with the line current. By making the amplitude of Vc proportional to the amplitude of the line current, the effect of series (capacitive) compensation can be faithfully reproduced.

Rapidly controllable phase shifters have not been implemented in practical systems yet. Schemes, which employ thyristor-controlled, tap-changing transformers, adapting techniques similar to those employed in conventional, mechanically switched tap-changing transformers, have been proposed and evaluated in laboratory models.

In principle, a thyristor-switched tap-changing transformer arrangement can change the magnitude of the voltage added in quadrature to the line voltage by the insertion transformer to control the phase-angle between the sending and receiving end voltages of the transmission line.

The tap-changing transformer type phase-shifter provides a step-like control, although the step size can be minimized by the judicious choice of the turn ratios selected. For example, with three non-identical transformer windings, in proportion of 1:3:9 and a switch arrangement that can bypass a winding or reverse its polarity, a total of 27 steps can be realized.

The thyristor-switched tap-changing transformer arrangement also suffers from the major disadvantage that it cannot generate or absorb reactive power. The reactive power it supplies to or absorbs from the line when it injects the quadrature voltage must be absorbed from it, or supplied to it, by the ac power system. The large voltage drops usually associated with reactive power transfer would tend to negate the effectives of the tap-changing phase-shifter for power flow control in many applications.

A primary object of the present invention is to provide a transmission system power flow controller which can respond rapidly to dynamically control in real time either singly or in combination any one of reactive power, transmission line impedance, transmission line voltage and transmission line voltage angle.

SUMMARY OF THE INVENTION

These and other objects are realized by the invention which is directed to a generalized fast flow controller for controlling the flow of power in an ac transmission line and includes inverter means which can inject in series with the voltage on the transmission line, a voltage of a selected magnitude and any phase angle between zero and 360 degrees with respect to the phase of the transmission line voltage. This complete freedom to select the magnitude and phase angle of the injected voltage provides the opportunity to adjust any one or more of the following system parameters: transmission line voltage magnitude, transmission line impedance and transmission line voltage phase angle. The real power required to inject such a voltage is advantageously provided in accordance with a preferred embodiment of the invention by another inverter which is connected in shunt with the transmission line, and to the other inverter by a dc link which preferably includes a dc link capacitor. The inverter connected in shunt with the transmission line is conveniently referred to as the first inverter. This first inverter, by adjusting the magnitude of a component of its ac voltage which is in quadrature with the transmission line current can be controlled to adjust reactive power on the transmission line. Through adjustment of the phase angle of this voltage, the first inverter can supply the real power required by the second inverter through the dc link.

Each of the inverters may comprise a plurality of six pulse inverters interconnected by interstage transformers to form higher order pulse groups for a high power flow controller system. Preferably, the first and second inverters are voltage source controlled inverters and are interchangeable for economies of manufacture and ease of service.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
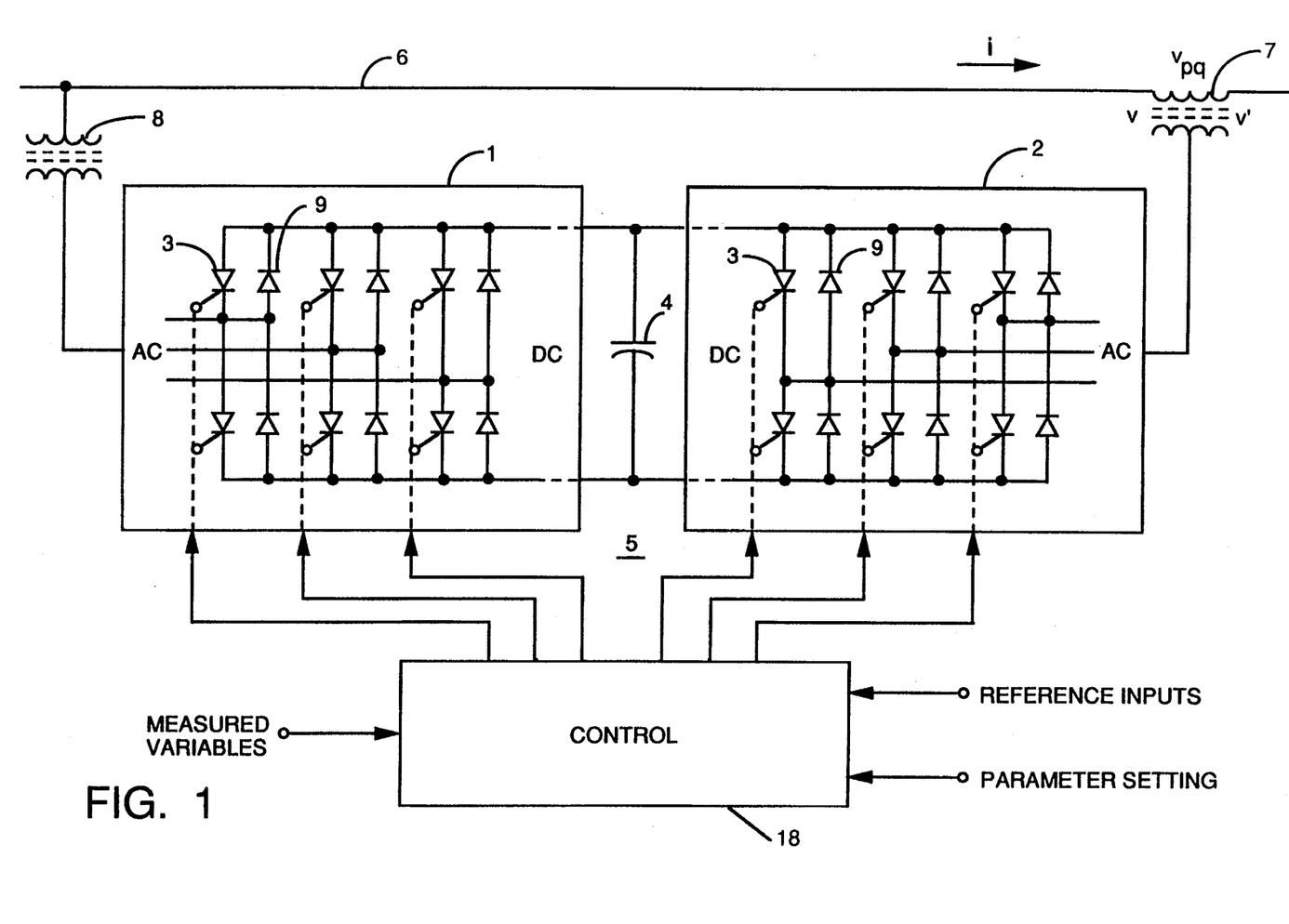
FIG. 1 is a schematic diagram of generalized power flow controller in accordance with the invention.

Referring to FIG. 1, two switching power converters 1 and 2 employing gate turn-off (GTO) thyristors 3 or similar power semiconductors, operated from a common dc link capacitor 4 form the generalized power flow controller 5 of the invention. One converter is, in fact, similar to the voltage-sourced inverter utilized in the solid state controllable series compensator scheme described in copending U.S. patent application Ser. No. 07/760,627, discussed above and hereby incorporated by reference. The other inverter 1 is similar to the voltage-sourced inverter used in the solid state static var compensator scheme described above.

Figure 2:
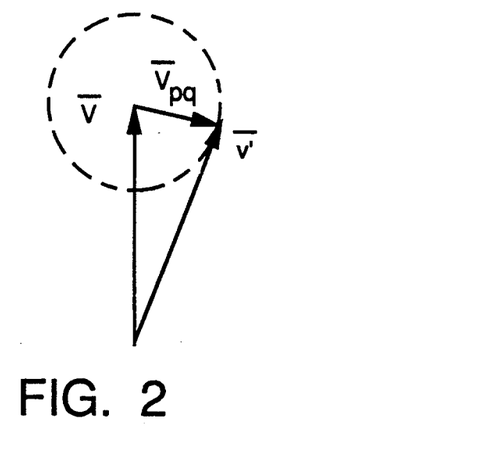
FIG. 2 is a phasor diagram illustrating the relationship of the voltage injected by the controller illustrated in FIG. 1 into a transmission system to the voltage in the transmission system.

Converter 2 is used to generate voltage v(pq) of controllable amplitude at the fundamental frequency that is added to the system voltage v on the transmission line 6 by the series connected coupling (or injection) transformer 7. The phase relationship of this injected voltage, v(pq), to the ac system voltage is arbitrary (i.e., it is fully controllable); it can be in quadrature, in phase or in any other phase relationship, as illustrated by the phasor diagram in FIG. 2. Thus, the injected voltage can be used for direct voltage control (the output voltage of converter 2 is added in phase to the system voltage), for phase-shifting (the injected voltage is the vectorial sum of two components, one representing an in-phase component for voltage control and the other one a quadrature component for phase-angle control). The output of converter 2 can also be used to provide series compensation for line impedance control. In this case, the voltage is injected in quadrature with respect to the line current. Actually, all of these quantities can be controlled simultaneously, if so desired, by deriving the required individual component voltages and generating their vectorial sum as the output of converter 2.

The voltage injected in series with the line acts essentially as a voltage source at the fundamental frequency connected in series with the system voltage provided by the generators of the ac system. The current flowing through the injected voltage source is the same as that of the transmission line 6 at the point of injection and it is determined essentially by the transmitted electric power and the impedance characteristic of the line. The VA rating of the injected voltage source (i.e., that of power converter 2 handling this VA) is determined by the product of the maximum injected voltage and the maximum line current. This total VA is made up of two components, one is the maximum real power determined by the maximum line current and the component of the maximum injected voltage that is in phase with this current, and the other one is the maximum reactive power determined by the maximum line current and the component of the maximum injected voltage that is in quadrature with this current. The voltage-sourced inverter, used to provide the function of converter 2, can internally generate all the reactive power exchanged as a result of the voltage/impedance/phase-angle control and only the real power has to be provided as its dc input power.

Switching converter 1 which in the preferred embodiment is also a voltage-sourced inverter connected in shunt with the ac system via a coupling transformer 8, is controlled to provide the real power demand at the common dc terminal from the ac system. Since converter 1, just like converter 2, can generate or absorb reactive power at its ac terminals, independently of the real power handled at its dc terminal, it follows that, with proper controls, it can also fulfill the function of an independent static var compensator providing reactive power compensation for the transmission network, and thus executing an indirect voltage and power flow control.

As explained above, the proposed power flow controller arrangement, with proper controls 9 controlling the firing of the GTO thyristors 3 in the inverters 1 and 2, can provide, in any combination, all the functions of available state-of-the-art transmission system compensation/control equipment: static var compensator, controllable series compensator, thyristor-controlled tap-changing transformer for direct voltage regulation, and thyristor-controlled tap-changing transformer for phase-shifting, in one piece of equipment. Furthermore, the total VA rating of the proposed power flow controller is not higher than that required for the single function, state-of-the-art thyristor-controlled tap-changing transformer type phase-shifter alone. It should also be noted that the state-of-the-art phase-shifter not only would be unable to supply any reactive power for external network compensation, but it could not internally provide the vats generated or absorbed in the normal phase-shifting process; all reactive power involved would have to be supplied by the ac system or by a separate reactive power source, such as a static var compensator.

In order to provide the functional capabilities of the proposed power flow controller, the two voltage sourced inverters, representing converters 1 and 2 in the basic scheme, have to be operated from a common dc capacitor link in such a way that the independent control of the selected network parameters (i.e., voltage, impedance, phase-angle, and reactive power) and the coordinated control of the total real power demand (due to direct voltage control, phase-angle control, and internal inverter losses) is possible.

Considering inverter (converter) 1, the flow of real power to or from the ac terminals of an inverter, and therefore that flowing in or out of the dc link, is determined by the phase-angle of the ac voltages generated by the inverter with respect to the ac system voltages. On the other hand, the flow of reactive power to or from the inverter at its ac terminals is determined by the amplitude difference between the inverter and ac system voltages: if this difference is zero (the inverter voltage has the same amplitude as the system voltage) then the reactive power is also zero, if this difference is positive (the amplitude of the inverter voltage is larger) then the inverter supplies reactive (capacitive) power, and if this difference is negative (the amplitude of the inverter voltage is smaller) then the inverter consumes reactive (inductive) power. The difference voltage needed for full vat output is determined mostly by the leakage impedance of the coupling transformer 8; it is typically not more than 15% of the nominal system voltage. Thus, in order to control the real and reactive powers independently, the nominal dc link voltage has to be large enough to generate the inverter 1 output voltages with an amplitude similar to that of the ac system voltage on the secondary side of the coupling transformer 8.

The situation with inverter (converter) 2, which injects the desired ac voltage in series with the line, is quite different. In this case, an ac voltage vector, represented by its magnitude and phase-angle with respect to a given reference (e.g., system voltage or line current vector) is generated to meet power flow requirements. At the quiescent point, this voltage vector could be zero (no voltage control, no phase-shift, and no impedance compensation) which would require zero or a small dc link voltage, if the amplitude of the ac output voltage is directly related to the dc link voltage. As the magnitude of the injected voltage vector in increased, the dc link voltage would also have to be increased in direct proportion. The real power demand resulting form the voltage injection would appear directly at the dc terminals whereas the required reactive power would automatically be generated internally by the inverter. The dc link must able to supply the real power demand (via inverter 1), otherwise the output voltage of the inverter 2 could not be maintained.

In order to correlate the different, basic operating requirements of inverter 1 (relatively high dc link voltage corresponding to the amplitude of the ac system voltage at zero var generation and moderate variation from this for rated var output) and inverter 2 (zero dc link voltage for zero voltage injection which is to be increased in proportion to the amplitude of the injected voltage), in the preferred embodiment it is assumed that the amplitudes of the generated output voltages of both inverter 1 and inverter 2 are controllable internally by such well-known techniques as pulse-width-modulation (PWM) or vectorial summation of voltages generated by two (groups of) inverters supplying a common coupling transformer. With this arrangement, the dc link voltage can be kept (by inverter 1) at an essentially constant level that corresponds to the highest output voltage produced by either inverter. It should be noted that this arrangement is not a necessary requirement for the operation of the proposed scheme. Indeed, it would be possible, for example, to operate inverter 1 without internal voltage control. In this case, the dc link voltage would be established according to the reactive power compensation provided by this inverter (which would vary typically about ±15% around the quiescent value representing the nominal amplitude of the ac system voltage). Inverter 2 would control the amplitude of its own output voltage from the moderately varying dc link voltage by an internal (e.g., PWM) control mechanism.

The voltage-sourced inverter 2, used in the embodiment of the proposed series compensation, in its simplest form is composed of six self-commutated semiconductor switches, such as the Gate-Turn-Off (GTO) thyristors 3, each of which is shunted by a reverse-parallel connected diode 9, as illustrated in FIG. 1. From a dc supply (which is provided by the charged capacitor 4) connected to its input terminals, the inverters 1 and 2 can each produce a set of three quasi-square voltage waveforms of a given frequency by connecting the dc input voltage sequentially to the three output terminals via the appropriate inverter switches. The operation of the inverter switches and the generated voltage waveforms at the centers of the switch "poles" (vA, vB, and vC) and at the output (vAB, vBC, and vCA) are illustrated in FIG. 3.

Figure 3:
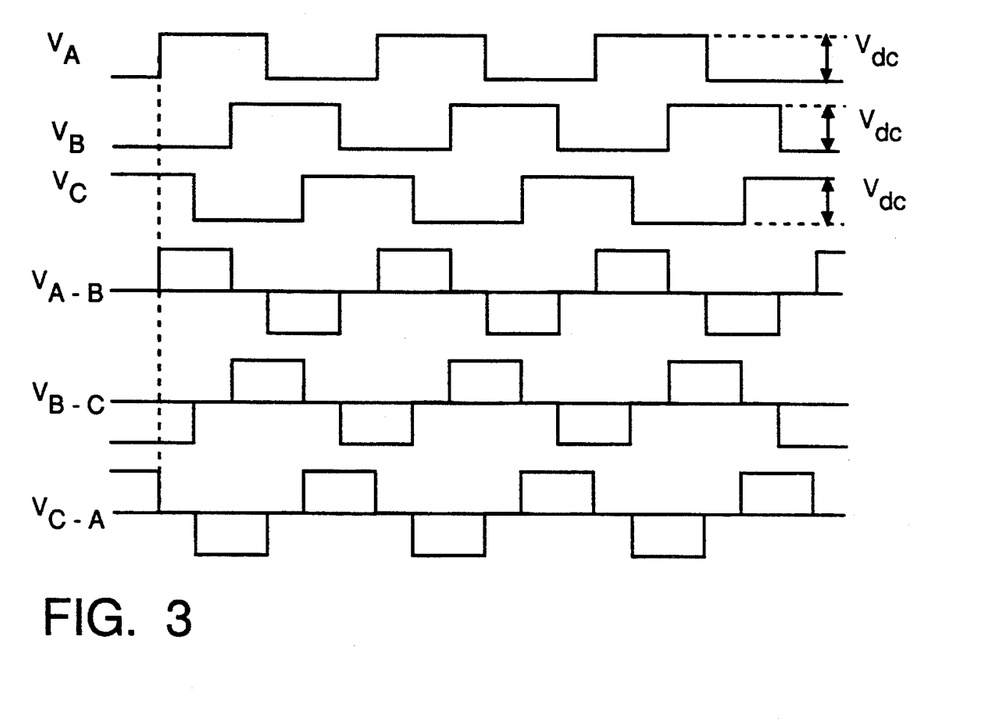
FIG. 3 illustrates inverter pole and output voltage waveforms for the inverters which form part of the power flow controller of FIG. 1.

The basic inverter 2 shown in FIG. 1 operated to produce the output voltage waveforms illustrated in FIG. 3 would produce too much distortion for most practical applications. Also, it would not be able to control the magnitude of the output voltage independently of the dc link voltage. For these reasons, for practical applications considered the output voltage waveform would be constructed so as to minimize the generation of harmonic components and allow the control of the fundamental component. There are various well known techniques, such as pulse-width-modulation and multi-pulse waveform synthesis (harmonic neutralization), together with vectorial summation of phase-displaced fundamental components generated by separate inverter groups (e.g., "doubly fed" coupling transformer arrangements) to accomplish this.

Figure 4A:
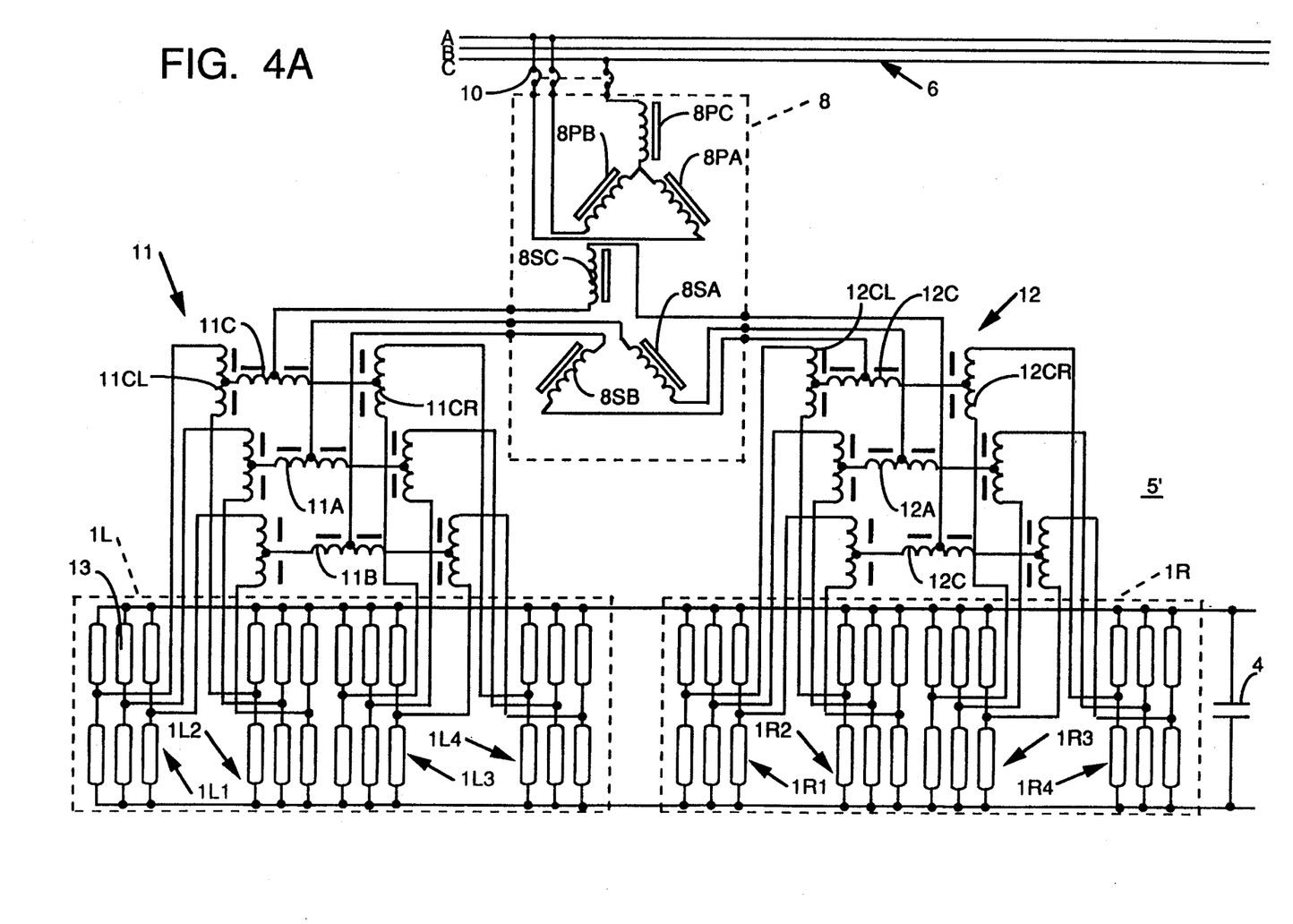
FIG. 4A and 4B when placed side by side comprise a schematic circuit diagram of a high power inverter system configured for the power flow controller of the invention.
Figure 4B:
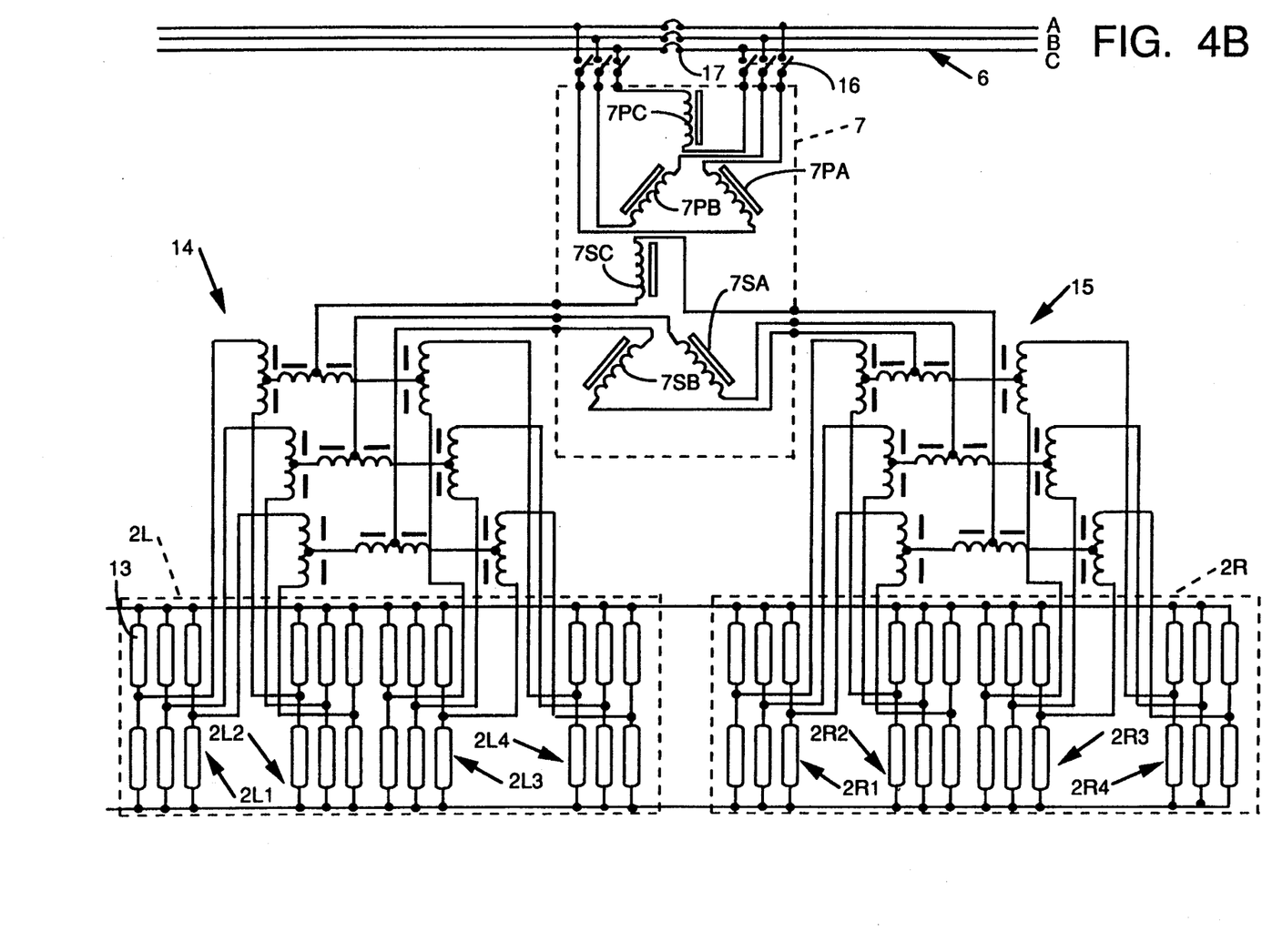

A high power converter system for the power flow controller 5' is shown schematically in FIGS. 4A and 4B. In this arrangement, the wye connected three primary windings 8PA, 8PB and 8PC of the shunt transformer 8 are connected to the three phases of the transmission line 6 through a three phase disconnect switch 10. Each phase winding 8SA, 8SB and 8SC of the secondary of transformer 8 is double fed from section 1L and 1R of the inverter 1 through arrangements 11 and 12 of interstage transformers. Each of the sections 1L and 1R of the converter 1 comprise four six-pulse inverter groups 1L1–1L4 and 1R1–1R4, respectively. In each of these six pulse groups, the symbol 13 represents a GTO thyristor 3 and its associated shunt diode 9. By way of example, the secondary winding 8SC for phase C of the shunt transformer 8 is fed at opposite ends through interstage transformers 11C and 12C. Opposite ends of the transformer winding 11C are fed by windings 11CL and 11CR. Opposite ends of the winding 11CL are in turn fed by phase C of the six pulse groups 1L1 and 1L2 while the opposite ends of winding 11CR are fed by phase C of the six pulse groups 1L3 and 1L4. Similarly, the C phase GTO thyristors of the pulse groups 1R1 and 1R2 feed opposite ends of transformer winding 12CL while the six pulse groups 1R3 and 1R4 are connected to the opposite ends of the inter-stage transformer 12CR. The transformers 12CL and 12CR are connected to opposite ends of the transformer 12C. By appropriately controlling the firing angles of the six pulse groups, the inverter sections 1L and 1R are opened to generate a forty-eight pulse voltage which is applied through the shunt transformer 8 to the transmission line 6. In accordance with the invention, the firing of the GTO thyristors in the 8 six pulse groups is controlled to appropriately set the magnitude and phase angle of the voltage applied by the shunt transformer 8 to the transmission line 6.

The inverter 2 of the high power inverter system 5' shown in FIG. 4B is also a 48-pulse inverter system having two sections, 2L and 2R, each having four six-pulse inverter modules, 2L1–2L4 and 2R1–2R4, respectively, connected through interstage transformer arrangements 14 and 15 to opposite ends of the three-phase winding 7SC, 7SA and 7SB of the secondary of the injection transformer 7. The three primary windings 7PC, 7PA and 7PB are connected in series with the three-phase transmission line 6 by the closing of switch 16 and the opening of breaker 17. Through control of the firing angles of the GTO thyristors in the inverter modules, the magnitude and phase angle relative to the transmission line voltage, of the voltage injected by the inverter 7 into the transmission line 6 can be controlled in accordance with the invention.

Returning to FIG. 1, the control 18 operating the two voltage-sourced inverters is an integral part of the proposed power flow controller system 5. Its major function is to operate the two inverts 1 and 2 in a coordinated manner so as to ensure that:

(1) the ac output voltage of inverter 2 injected in series with the line 6 has the proper magnitude and phase-angle to meet the instantaneous requirements for the controlled system parameters (line impedance, phase-angle, voltage magnitude) at the output end of the insertion transformer 7 for optimum power transfer as dictated by the relevant reference signals supplied to the control 18, and (2) the ac output voltage of inverter 1 coupled to the ac system by the shunt-connected transformer 8 has the proper magnitude and phase-angle to provide the real power demand of inverter 2 and to generate or absorb the reactive power at the input end of the insertion transformer 7 to regulate the voltage at that point according to an externally defined reference.

The control 18 is structured so as to accept externally derived reference signals. These signals are used in appropriate closed control-loops to force the inverters to generate their output voltages to match the references. The derivation of the reference signals is done by the external measurement of relevant parameters of the ac system. This is not part of the present invention; however, techniques described in U.S. patent application Ser. No. 07/760,628 incorporated by reference are suitable.

Figure 5:
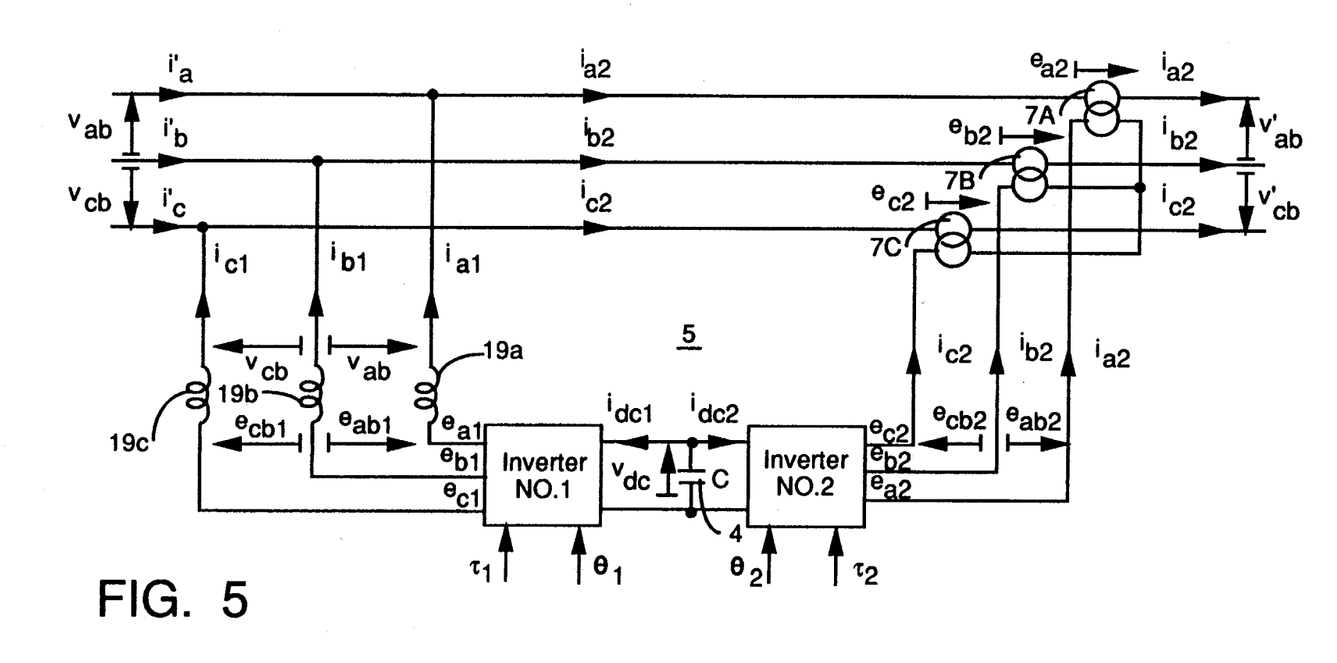
FIG. 5 illustrates a simplified functional representation of the power flow controller of FIG. 1.

In order to define and verify the control scheme implemented by the control for the two voltage-sourced inverters 1 and 2, it is necessary to first establish a model that represents the dynamic behavior of the system. FIG. 5 presents a simplified functional representation of the power flow controller 5. The two inverters 1 and 2 are shown as ideal voltage converters, each converting its dc-side voltage ($v_{dc}$) into a balanced set of three sinusoidal ac-side voltages with instantaneous phase angle, $\theta$, and instantaneous magnitude $\tau \cdot v_{dc}$ in the following manner:

$$\begin{bmatrix} e_{a1} \\ e_{b1} \\ e_{c1} \end{bmatrix} = \begin{bmatrix} \tau_1 v_{dc} \cos(\theta_1) \\ \tau_1 v_{dc} \cos\left(\theta_1 - \frac{2\pi}{3}\right) \\ \tau_1 v_{dc} \cos\left(\theta_1 + \frac{2\pi}{3}\right) \end{bmatrix}$$

$$\begin{bmatrix} e_{a2} \\ e_{b2} \\ e_{c2} \end{bmatrix} = \begin{bmatrix} \tau_2 v_{dc} \cos(\theta_2) \\ \tau_2 v_{dc} \cos\left(\theta_2 - \frac{2\pi}{3}\right) \\ \tau_2 v_{dc} \cos\left(\theta_2 + \frac{2\pi}{3}\right) \end{bmatrix}$$

In each case $\tau$ and $\theta$ are established by the appropriate gating of the power switches 3 in the inverter. These parameters can be rapidly and independently varied in response to reference signals ($\tau^*$, $\theta^*$) supplied by the control system 18. These reference signals are the only control inputs to the system.

FIG. 5 shows the ac-side voltages of Inverter 2 coupled in series with the transmission line through an ideal transformer 7A, 7B, 7C. We therefore neglect the effects of leakage reactance in the transformer and assume that the ac-side currents of Inverter 2 are proportional to the transmission line currents. The ac-side of Inverter 1 is shown to be connected to the transmission line via series-connected inductors 19A, 19B and 19C representing the equivalent leakage inductance of the transformer 8 (see FIG. 1) which is shunt-connected to the transmission line 6 in the actual circuit.

Figure 6:
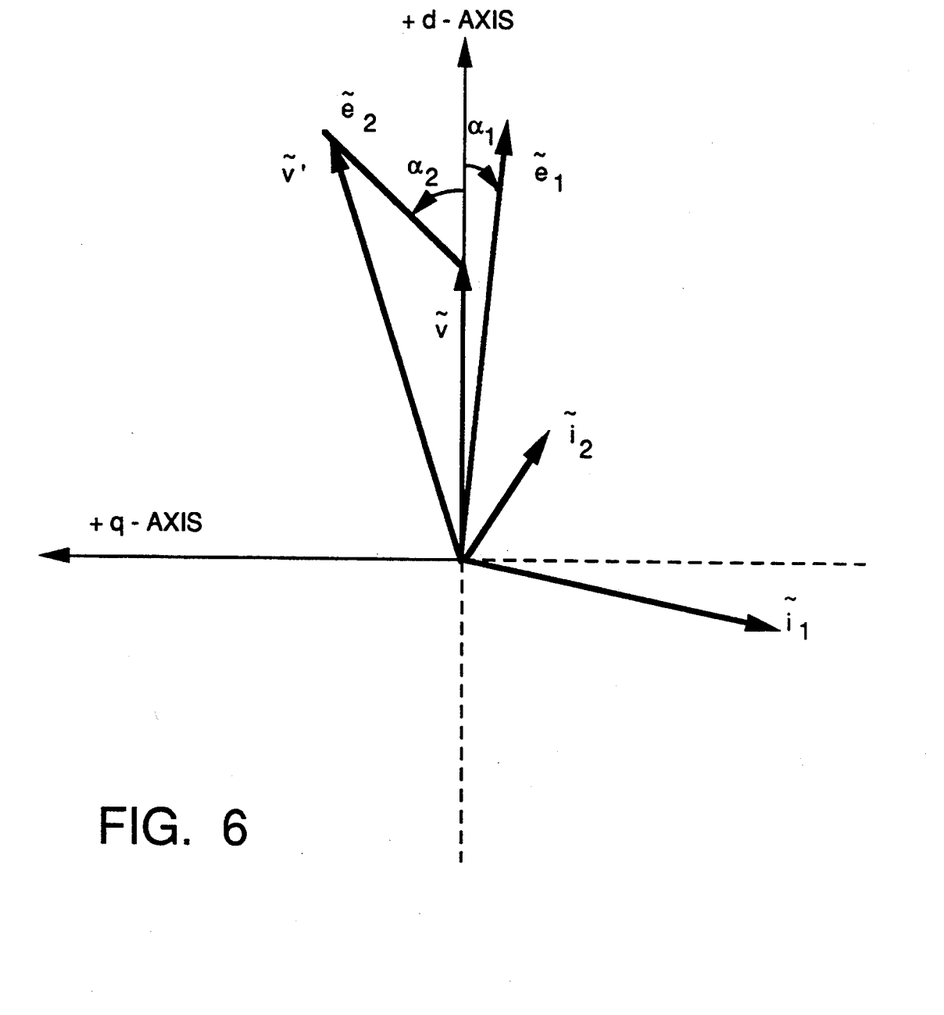
FIG. 6 is a phasor diagram illustrating relevant system variables in a reference frame selected for explanation of the operation of the invention.
Figure 8:
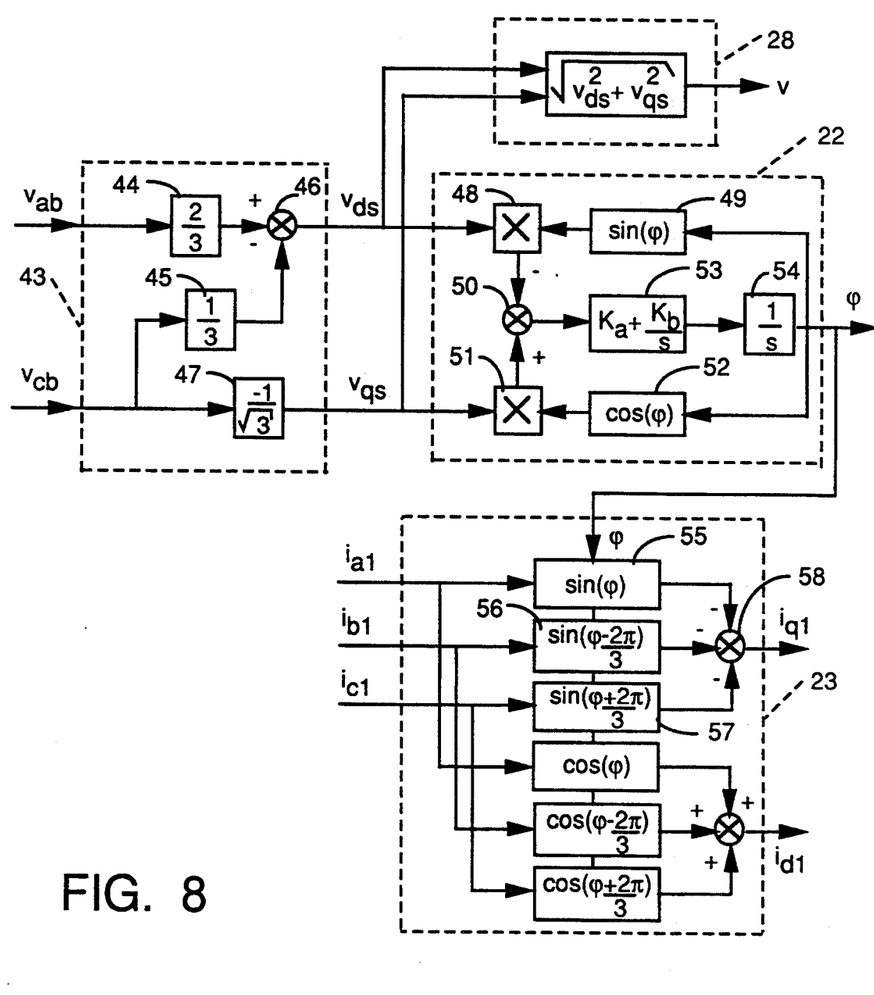
FIG. 8 illustrates in more detail certain of the components of the control system of FIG. 6.

FIG. 5 establishes labels and polarity conventions for the currents and voltages in the various branches of the equivalent power circuit. In addition, a convenient vectorial notation is used to represent the instantaneous values of the three-phase sets of variables (currents and voltages.) According to this notation, the instantaneous value of each of the three-phase sets is characterized by a two-dimensional vector defined by its coordinates in an orthogonal (d, q-axis) reference frame. The reference frame is defined in such a way that the d-axis is always (by definition) coincident with a selected reference vector. In this case, the reference vector is the transmission line voltage at the point of connection for Inverter 1. FIG. 8, to be described below, defines how all of the relevant system vectors are obtained in this reference frame from the associated three-phase quantities. The phasor diagram in FIG. 6 illustrates these vectors graphically.

This vectorial notation is introduced because the d, q-components of the vectors in the chosen reference frame facilitate the description of instantaneous power flow. In the case of Inverter 1, the instantaneous power negotiated from the transmission line is $$P_1 = 3/2 \ v \cdot i_{d1} \qquad \text{Eq. 2}$$

Thus, the current component $i_{d1}$ accounts for all of the real power regardless of the value of $i_{q1}$. Therefore, $i_{q1}$ is defined as the "instantaneous reactive current" in this branch and we can further define the instantaneous reactive power as $$Q_1 = 3/2 \ v \cdot i_{q1} \qquad \text{Eq. 3}$$

The control system seeks to control these two components separately in order to satisfy the real power demand (for dc-capacitor voltage control) and the reactive power demand (for the external system control.)

In the case of Inverter 2, the ac-side terminal voltage vector $\tilde{e}_2$ ($e_{d2}, e_{q2}$) is effectively added to the reference voltage vector (v,0) to produce the adjusted output voltage vector $\tilde{v}$ ($v'_d$, $v'_q$). Since $\tilde{e}_2$ can be assigned an arbitrary phase angle relative to $\tilde{v}$ and an arbitrary magnitude (within limits) virtually instantaneously, $\tilde{v}$, can be rapidly and accurately adjusted in phase and magnitude.

FIG. 6 illustrates the disposition of the system vectors for a typical steady state operating condition. Notice that if the vector $\tilde{e}_2$ is allowed to assume arbitrary phase angles, Inverter 2 will inevitably negotiate real power from the transmission line. This power is given by $$P_2 = 3/2 (e_{d2} \cdot i_{d2} + e_{q2} \cdot i_{q2}) \qquad \text{Eq. 4}$$

Neglecting power losses in the inverters, we assume that in each case the ac side terminal power appears in equal quantity at the dc terminals. Since Inverter 2 has the freedom to alter its real power, Inverter 1 must therefore establish an equal and opposite real power plus an additional amount required to replenish losses and maintain the capacitor voltage at a set level.

Figure 7:
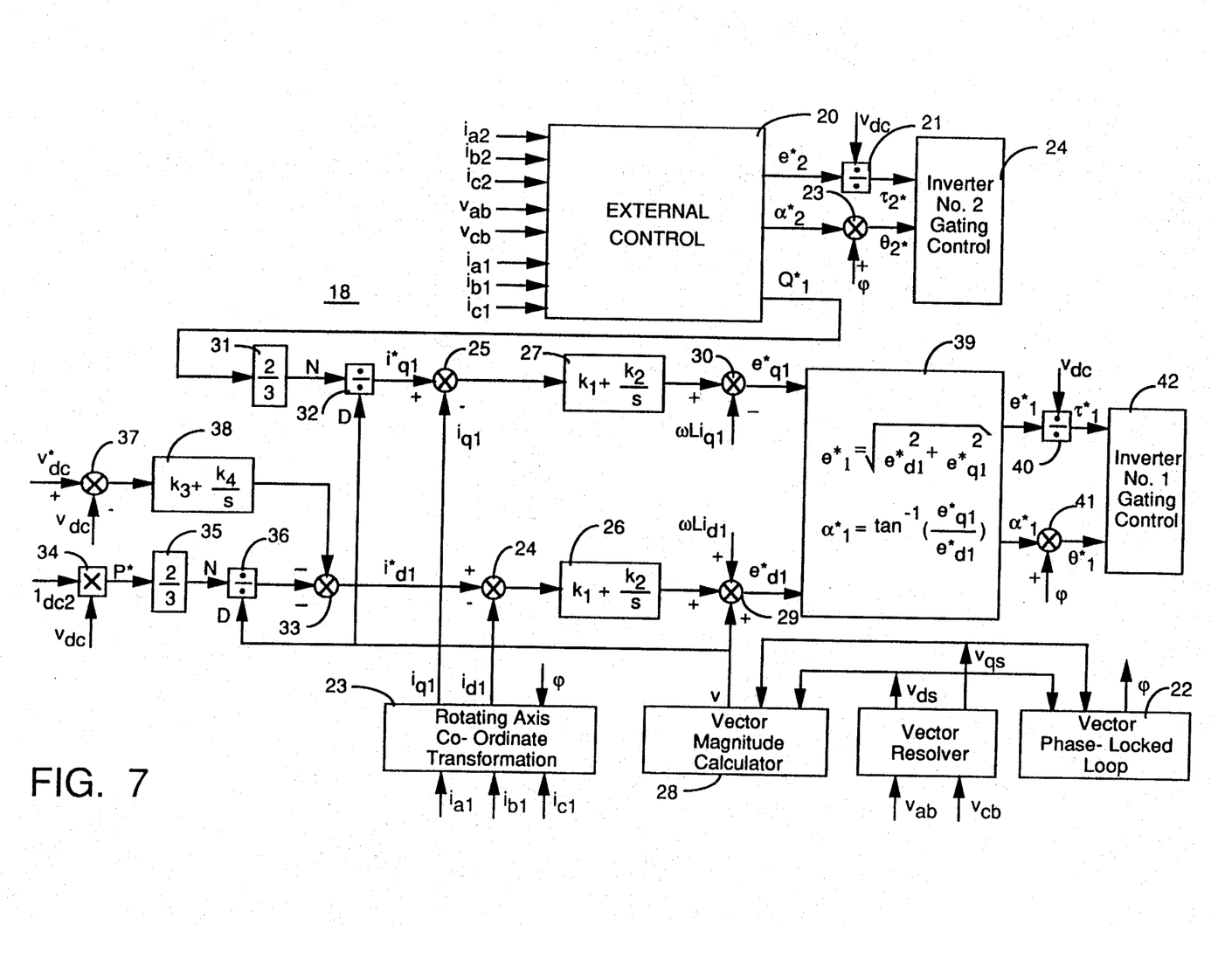
FIG. 7 is schematic diagram in block form of the control system which forms part of the power flow controller of FIG. 1.

The control system 18 is presented in FIG. 7. The external control 20 utilizes the measured variables including the three phase currents, $i_{a1}-i_{c1}$ supplied by inverter 1 to the transmission line system, the ac currents $i_{a2}-i_{c2}$, flowing through the second inverter and the line to line voltages $v_{ab}-v_{cb}$ on a transmission line at the point where the inverter 1 is connected to the transmission line, together with the reference inputs and parameter settings determined as discussed above to set the reference value for the magnitude $e^*_2$ in the transformed reference system for the voltage to be injected by the inverter 2 into the transmission line. This voltage reference is transformed into coordinates for the fixed reference plane by dividing $e^*_2$ by $v_{dc}$ in block 21 to generate the magnitude reference $\tau^*_2$ and by summing the angle reference $\alpha^*_2$ with the angle $\phi$ generated by the vector phased locked loop 22 in summing junction 23 to generate the phase angle reference $\theta^*_2$. The references $\tau^*_2$ and $\theta^*_2$ are applied to the gating control 24 for inverter 2 which fires the GTO thyristors of inverter 2 to generate the injected voltage at the required magnitude and phase angle.

As mentioned previously, the control of $\tilde{e}_2$ by means of Inverter 2 is trivial and virtually instantaneous. The control system is thus mainly concerned with controlling the ac-side currents $(i_{d1},i_{q1})$ of Inverter 1 so as to maintain the dc side voltage and satisfy the shunt reactive power demand, $Q_1^*$, which is also derived by the external control 20.

The controller operates with feedback of the measured vector, $\tilde{i}_1$, having components $i_{d1}$, $i_q$, which are generated by a Rotated Axis Coordinate Transformation function 23 from inverter 1 ac currents $i_{a1}$, $i_{b1}$ and $i_{c1}$ using the angles $\phi$ generated by the phase-locked loop 22. Under steady state balanced sinusoidal conditions, the vector $\tilde{i}_1$ is a constant. The components $i_{d1}$, $i_{q1}$ are compared in summation-difference junctions 24 and 25, respectively with reference values $i^*_{d1}$, $i^*_{q1}$ to produce d- and q-error signals, each of which is passed through a proportional plus integral compensation block 26, 27. The magnitude of the line voltage vector $(\tilde{v})$ is measured in block 28 and fed forward into the forward path of the d-axis control through summing junction 29 to eliminate any effects due to the dynamics of the transmission line. The resulting d- and q-axis signals define the ac-side voltage vector demand $e^*_{d1},e^*_{q1}$ for Inverter 1. The controller thus uses $e_{d1}$ to influence the value of $i_{d1}$ and $e_{q1}$ to influence $i_{q1}$. Thus, there is cross-coupling between the d- and q-axis quantities, so that changes in $e_{q1}$ and $e_{q1}$ also produce changes in $i_{q1}$ and $i_{d1}$, respectively. Closed-loop analysis has shown that these interactions do not significantly detract from the dynamic behavior of the system. However, the d-q axis cross-coupling can be removed by feedforward of the term $\omega L i_{q1}$ into the d-axis error path through junction 30 and $\omega L i_{d1}$ into the q-axis error path as indicated by the dashed lines in FIG. 7. L is the leakage inductance of the shunt transformer 8 and $\omega$ is the system fundamental frequency.

The two components, $i^*_{d1}$ and $i^*_{q1}$, of the current reference vector are derived from separate sources. The reference value $i^*_{q1}$ is simply derived from $Q^*_1$, the reactive power demand generated by the external control system 20 in accordance with Eq. 3, above, by applying a scalar factor of 2/3 in block 31 and by dividing the result by the vector magnitude v in the divide function 32. On the other hand, $i^*_{d1}$, which is responsible for the real power negotiated by Inverter 1, comprises two components which are summed at junction 33. The first of these is the negative of the real power of Inverter 2, measured at its dc terminals. Thus, dc current $i_{dc2}$ is multiplied by the dc voltage $v_{dc}$ in multiplier 34. The product P* is scaled by the factor 2/3 in block 35 and then divided by the voltage magnitude v in divide block 36. The resultant signal allows the real power of Inverter 1 to be rapidly adjusted to track the arbitrary real power variations of Inverter 2.

The second part of $i^*_{d1}$ comes from the error signal of the feedback control loop that is responsible for regulating the dc-link voltage, $v_{dc}$, to a reference value, $v^*_{dc}$. The error between the measured dc-link voltage $v_{dc}$ and the reference value $v^*_{dc}$ is generated in the difference function block 37. Proportional plus integral control is applied to the error in block 38. This loop compensates for system power losses and other non-ideal behavior that would otherwise cause the value of $v_{dc}$ to change erratically.

The values $e^*_{d1}$ and $e^*_{q1}$, present real and imaginary components of the voltage to be injected by inverter 2 in the rotating reference coordinate system. The vector $\tilde{e}_1$ is transformed to polar coordinates $e^*_{d1}$ and $\alpha^*_1$ in block 39. The magnitude $e^*_1$ is normalized to the dc link voltage $v_{dc}$ by divider function 40 to generate the magnitude reference $\tau^*_1$. The angle $\phi$ generated by the phase lock loop 22 is added to $\alpha^*_1$ in the summing junction 41 to produce the reference phase angle $\theta^*_1$. As indicated in FIG. 7, $\tau^*_1$ and $\phi^*_1$ serve as the inputs to the gating control 42 for inverter 1.

FIG. 8 illustrates in more detail some of the elements of the control system of FIG. 7. The vector resolver 43 generates the real and imaginary components $v_{ds}$ and $v_{qs}$ of a vector v in the rotating reference system from the measured line to line voltages $v_{ab}$ and $v_{cb}$. The real component $v_{ds}$ is generated by applying a scalar factor of 2/3 $v_{ab}$ in block 44, scaling $v_{cb}$ by a factor of $\frac{1}{3}$ in block 45 and generating the difference at junction 46. The imaginary component $v_{qs}$ is generated by applying a scalar factor of $-1/\sqrt{3}$ in block 47. The Vector Magnitude Calculator 28 generates v, the magnitude of the transmission line voltage from the real and imaginary components $v_{ds}$ AND $V_{qs}$.

The Vector Phase Locked Loop 22 generates the phase angle $\phi$ for synchronizing the firing of the inverter GTO-thyristors to the transmission line voltage. The real component $v_{ds}$ is multiplied in block 48 by the sine of the angle $\phi$ derived in block 49. This product is subtracted in the difference junction 50 from the product calculated in block 51 of the imaginary component of the voltage $v_{qs}$ and the cosine of $\phi$ derived in block 52. Proportional plus integral control is applied to the difference in block 53 and the result is integrated in block 54 to generate the angle $\phi$.

The angle $\phi$ is used by the Rotating Axis Coordinate Transformation block 23 to generate the real and imaginary components of inverter 1 current from the measured three-phase inverter 1 currents. The three phase currents $i_{a1}$, $i_{b1}$ and $1_{c1}$ are multiplied by sine functions of $\phi$ in blocks 55–57, respectively, with the results negatively summed in junction 58 to generate the imaginary component $i_{q1}$ of inverter 1 current in the rotating axis reference system. Similarly, the measured currents are multiplied by cosine functions of $\phi$ in blocks 59-61 and summed in junction 62 to generate the real component $i_{d1}$.

The flow controller of the invention controls with one piece of equipment all of the functions previously performed by separate pieces of equipment. Inverter 1 may be operated to regulate the reactive power on the transmission line, while supplying real power to inverter 2. Inverter 2 may be used to independently or simultaneously adjust line impedance, voltage phase angle or voltage magnitude. Thus, the flow controller of the invention can be used to limit fault current through adjustment of line impedance by converter 2. It can also be used for current equalization in parallel transmission lines through adjustment of transmission line impedance or through phase angle adjustment. Another advantage of the flow controller of the invention is that it injects a voltage only at the fundamental frequency, hence it does not induce subsynchronous resonance. On the other other hand, it can be used to dampen oscillations if there is an existing capacitor in the transmission line. All of this can be accomplished economically in that inverters 1 and 2 are identical, therefore providing opportunities for economies in manufacture.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A power flow controller for controlling the flow of electric power in an alternating current transmission system including a transmission line having two ends and carrying alternating current at a selected transmission line voltage and fundamental frequency between said two ends, said controller comprising:
   switching power converter means generating an alternating voltage at said fundamental frequency of the said alternating current with controllable magnitude and phase angle relative to said transmission line voltage;
   means coupling the alternating voltage generated by said switching power converter means in series with said transmission line voltage; and
   control means controlling the controllable magnitude and phase angle of the alternating voltage generated by said switching power converter means at said fundamental frequency to a magnitude and any phase angle relative to said transmission line voltage to selectively adjust, individually and in coordination, effective impedance of said transmission line, effective phase angle between voltages at said two ends of said transmission line, and transmission line voltage magnitude to thereby control the power flow in said transmission line.

2. The power flow controller of claim 1 wherein said switching power converter means comprises a dc to ac inverter and means supplying dc power to said inverter.

3. The power flow controller of claim 2 wherein said means supplying dc power to said dc to ac inverter includes an additional dc to ac inverter, means connecting dc terminals of said additional inverter to dc terminals of said dc to ac inverter, and means coupling ac terminals of said additional inverter to an ac power source.

4. The power flow controller of claim 3 wherein said ac power source is the said transmission line.

5. The power flow controller of claim 1 wherein the switching power converter means comprises ac to ac converter means generating said alternating voltage at output terminals and means supplying ac power to input terminals of said ac to ac converter means.

6. The power flow controller of claim 5 wherein said means supplying ac power to said ac to ac converter means includes means coupling said input terminals to the transmission line.

7. The power flow controller of claim 1 wherein the control means controlling the controllable magnitude and phase angle of the alternating voltage generated by said switching power converter means selectively adjusts effective real and reactive series impedance of said transmission line.

8. The power flow controller of claim 1 wherein the control means includes first means for deriving the magnitude and phase angle of said alternating voltage coupled in series to said transmission line to establish the selected transmission line impedance, selected transmission angle, and selected transmission line voltage to establish the selected power flow in said transmission line, and second means responsive to said first means for operating said switching power converter means so as to generate said alternating voltage.

9. A generalized fast power flow controller for an ac transmission line, said controller comprising:
   first dc to ac inverter means having ac terminals connected in shunt with the transmission line and having dc terminals;
   second dc to ac inverter means having ac terminals connected to inject an alternating voltage in series with said transmission line and having dc terminals;
   dc links means connecting the dc terminals of said first and second inverters; and
   control means controlling real and reactive power exchange between said transmission line and said first inverter to supply real power for the said second inverter at a selected power factor, said control means also controlling said second inverter means to generate said alternating voltage with a selected magnitude and selected phase angle between 0° and 360° to establish a selected transmission line impedance, a selected transmission angle, and a selected transmission line voltage for controlling power flow through said transmission line.

10. The power flow controller of claim 9 wherein said control means is a vector controller providing gating signals for said first and said second inverters, said controller comprising:
   phase-locked loop means for generating an angle signal representative of ac transmission line voltage vector phase angle;
   magnitude calculator means for generating a magnitude signal representative of a transmission line voltage vector magnitude;
   co-ordinate transformation means for generating a first current signal representative of an in-phase ac current of said first inverter means and a second current signal representative of a quadrature ac current of said first inverter means;

dc voltage control means for generating an in-phase ac current reference signal for said first inverter;

reference means for generating a quadrature reference signal for said quadrature ac current vector magnitude reference signal for said second inverter and an ac voltage vector angle reference signal for said second inverter;

means generating gating signals for said first inverter from said angle signal, said magnitude signal, said first current signal, said second current signal and said in-phase ac current reference signal; and means generating gating signals for said second inverter from said angle signal, said ac voltage vector magnitude reference signal, and said ac voltage vector angle signal.

11. The power flow controller of claim 10 wherein said dc voltage control means is responsive to a dc voltage feedback signal representative of dc voltage between said first inverter and said second inverter, a dc current feedback signal representative of dc current of said second inverter, and a dc voltage reference signal representative of a desired dc voltage level.

12. The power flow controller of claim 10 wherein said reference means is responsive to at least one of signals representative of a transmission line voltage vector, a transmission line current vector, and an ac current vector of said first inverter.

13. The controller of claim 9 wherein said dc link means includes energy storage means for storing real power.

14. The controller of claim 13 wherein said energy storage means comprises capacitor means.

15. The controller of claim 9 wherein said first and second inverter means are both voltage sourced inverters.

16. The controller of claim 9 wherein said first and second inverters are both current sourced inverters.

* * * * *